United States Patent [19]

Upadhyaya et al.

[11] Patent Number: 4,766,166

[45] Date of Patent: Aug. 23, 1988

[54] COMPOSITIONS HAVING THE PROPERTIES OF LOW VISCOSITY POLYETHYLENES

[75] Inventors: Janardan D. Upadhyaya, Fairfield; Harry M. Farnham, Easton; Ing C. Lin, North Haven; Alan R. Case, New Milford, all of Conn.

[73] Assignee: Moore and Munger Marketing and Refining, Inc., Shelton, Conn.

[21] Appl. No.: 14,510

[22] Filed: Feb. 13, 1987

[51] Int. Cl.$^4$ .................. C08L 23/06; C08L 91/06
[52] U.S. Cl. .................. 524/275; 524/487; 524/489
[58] Field of Search ............ 524/277, 487, 275, 489

[56] References Cited

U.S. PATENT DOCUMENTS

| | | | |
|---|---|---|---|
| 4,471,086 | 9/1984 | Foster | 524/487 |
| 4,544,694 | 10/1985 | Bower | 524/487 |
| 4,551,499 | 11/1985 | Cranfield et al. | 524/487 |
| 4,624,993 | 11/1986 | Upadhyaya | 525/288 |

FOREIGN PATENT DOCUMENTS 60-8346  1/1985  Japan .................. 524/487

OTHER PUBLICATIONS

Technical Data Sheet for A-C Low Viscosity Polyethylenes, Allied Chemical Corporation, Morristown, N.J., Mar., 1980.
Erchak, M., "Low Molecular Weight Polyethylenes," Semet-Solvay Petrochemical Division, Allied Chemical Corporation, Morristown, N.J.
"Epolene Waxes," Eastman Chemical Products, Inc., Kingsport, Tennessee, May, 1987.
"The Use of Sasolwaxes for the Processing of PVC," Sasolchem (Pty) Limited, Johannesburg, South Africa, Jan., 1986.
Wett, Theodore, "Inside the Alloy Works," *Chemical Business,* Jan., 1987, pp. 25–27.
"On the Track of New Polymer Blends," *Chemical Week,* Jul. 16, 1986, pp. 6–7.

*Primary Examiner*—Allan M. Lieberman
*Attorney, Agent, or Firm*—Maurice M. Klee

[57] ABSTRACT

Compositions are provided which comprise 50–80% of a synthetic wax, such as a Fischer-Tropsch wax, in combination with 10–50% of a polyethylene material having a Brookfield viscosity at 284° F. greater than about 5000 centipoise. The compositions serve as replacements for commercially available low viscosity polyethylenes, i.e., polyethylenes having Brookfield viscosities at 284° F. of less than about 1000 centipoise, in such applications as lubricating plastic extrusions and coating paperboard stock. The compositions can be prepared by melting and then mixing the components. Accordingly, custom tailoring of the compositions for specific applications can be readily performed.

8 Claims, No Drawings

COMPOSITIONS HAVING THE PROPERTIES OF LOW VISCOSITY POLYETHYLENES

BACKGROUND OF THE INVENTION

1. Field of the Invention

This invention relates to compositions of matter which have the properties of low viscosity polyethylenes but are composed of materials other than such polyethylenes.

2. Description of the Prior Art

Low viscosity polyethylenes, i.e., polyethylenes having Brookfield viscosities at 284° F. of less than about 1000 centipoise, have been found to be useful in a variety of applications. These materials, which are sometimes referred to as polyethylene waxes, have been used, inter alia, as mold release agents for rubber and plastics, as lubricants for plastic extrusions, and as coatings for paper and containers.

Polyethylenes of this type have been available from the Allied Chemical Corporation under the A-C® trademark and from Eastman Chemical Products, Inc., under the EPOLENE® trademark for a number of years. Examples of the more popular grades of these low viscosity polyethylenes include A-C®629, A-C®9, A-C®6, and EPOLENE® N-11, E-14, and N-12.

Low viscosity polyethylenes have generally been produced by polymerizing ethylene using special, proprietary processes. Accordingly, the number of producers of these materials has been limited and the cost of the materials has been relatively high in comparison with other polyethylene materials. In addition, the varieties of low viscosity polyethylene which have been commercially available has been limited by the need to perform a separate, customized polymerization for each variety produced.

As a result of these limitations in availability, cost and ease of manufacture, there has existed a need for improvements in the field of low viscosity polyethylenes. The present invention is directed to this need.

SUMMARY OF THE INVENTION

In view of the foregoing state of the art, it is an object of this invention to provide compositions which have the properties of low viscosity polyethylenes but which can be produced more simply and less expensively than the existing materials. It is a further object of the invention to provide a method whereby varieties of such compositions can be readily produced without the need to perform a customized polymerization for each variety. More particularly, it is an object of the invention to provide compositions which do not include low viscosity polyethylenes, but yet have the properties of such polyethylenes.

To achieve the foregoing and other objects, the invention provides compositions of matter which comprise:

(a) one or more synthetic waxes each of which has a Brookfield viscosity at 284° F. of less than 50 centipoise, a needle penetration value (ASTM D1321) at 77° F. of less than 20 mm/10, and a congealing point (ASTM D938) in the range of from about 160° F. to about 240° F., said one or more synthetic waxes comprising between about 50 and about 80 percent by weight of the total composition; and (b) a polyethylene material having a Brookfield viscosity at 284° F. greater than about 5000 centipoise, a needle penetration value (ASTM D1321) at 77° F. of less than 5 mm/10, and a softening point (ASTM E28) in the range of from about 200° F. to about 250° F., said polyethylene material comprising between about 10 and about 50 percent by weight of the total composition;

the final composition having a Brookfield viscosity at 284° F. of less than about 1000 centipoise, a needle penetration value (ASTM D1321) at 77° F. of less than 10 mm/10, and a melting point (ASTM D127) in the range of from about 190° F. to about 240° F.

Depending on the specific application for the composition, e.g., as a plastic lubricant, paperboard coating agent, etc., the synthetic wax component and/or the polyethylene component can be oxidized or non-oxidized. Also, mixtures of oxidized and non-oxidized materials can be used. In addition, again depending on the application, modifiers, such as ethylene copolymers, can be combined with the main components in amounts up to about 15 weight percent of the total composition. Such modifiers can be used to adjust such properties of the final composition as melting point, viscosity, acid number, and the like. The compositions can also include antioxidants and coloring agents in amounts up to about 2 weight percent of the total composition.

As demonstrated below, it has surprisingly been found that the properties of low viscosity polyethylenes, including such properties as acid number, viscosity, needle penetration, and melting point, can be readily matched by the compositions of the present invention. Even more importantly, the compositions have been found to perform the same function as low viscosity, polyethylenes, that is, they can be used as lubricants for extruding plastics, as coatings for paperboard, and in similar applications in which low viscosity polyethylenes have previously been employed.

Significantly, the components of the compositions of the present invention are readily availale at lower manufacturing costs than low viscosity polyethylenes. Thus, a variety of synthetic waxes having properties suitable for use in the present invention are commercially available both in oxidized and non-oxidized form. In addition, oxidation of synthetic waxes can be readily performed at moderate temperatures using conventional equipment (see Example 1 below). Polyethylenes suitable for use with the invention are also readily availalae at moderate cost in both oxidized and non-oxidized forms.

Moreover, as demonstrated below in Examples 2 to 5, the compositions of the present invention can be prepared by simply melting the synthetic wax component, melting the polyethylene component, and mixing the two components together. Accordingly, new varieties of these compositions can be readily produced in batches of essentially any desired size.

This ease of formulation gives the manufacturer great flexibility in producing compositions having properties which are custom tailored for specific applications. For the existing low viscosity polyethylenes produced by polymerization of ethylene, such flexibility has not been available. In addition, the ease of formulation means that large quantities of the finished compositions of the present invention do not have to be inventoried since the product can essentially be made to order. Again, because of the need to perform polymerizations, the economies resulting from small inventories have not been available to the manufacturers of the existing low viscosity polyethylenes.

DESCRIPTION OF THE PREFERRED EMBODIMENTS

As discussed above, the present invention relates to compositions comprising a synthetic wax component and a polyethylene component.

A variety of synthetic waxes known in the art can be used in the practice of the invention. Examples include: Fischer-Tropsch waxes sold under the PARAFLINT ® trademark by Moore and Munger Marketing and Refining, Inc., Fairfield, Conn.; Exxon's ESCOMER ® H101 synthetic wax (Exxon Chemical Company, Houston, Tex.); $C_{30+}$ alpha-olefins sold under the GULFTENE ® trademark by Chevron Chemical Company, Houston, Tex.; and C-4040 synthetic waxes sold under the PETROLITE ® trademark by Petrolite Corporation, Tulsa, Okla. Each of these waxes is produced synthetically by polymerizing smaller building blocks, as opposed to being produced by extraction, as in the case of petroleum and vegetable waxes. Mixtures of these waxes can also be used. Of the various synthetic waxes, Fischer-Tropsch waxes are preferred.

For use with the present invention, the synthetic wax must have (1) a Brookfield viscosity at 284° F. of less than 50 centipoise, (2) a needle penetration value at 77° F. of less than 20 mm/10, and (3) a congealing point in the range of 160° F. to 240° F. For those applications in which an oxidized synthetic wax is used, the wax should preferably have an acid number between about 2 and about 50, and most preferably between about 10 and about 30. Many of the above synthetic waxes and, in particular, the preferred Fischer-Tropsch waxes, are commercially available in oxidized forms having the foregoing acid numbers. If not previously oxidized, the synthetic wax can be readily oxidized by various procedures.

A preferred oxidation procedure, described in more detail below in Example 1, involves heating the synthetic wax to a temperature above its melting point, e.g., to a temperature approximately 30° C. above its melting point, and then reacting the wax with oxygen by simultaneously stirring the molten wax and sparging it with small air bubbles, e.g., air bubbles having a diameter of less than about 10 millimeters, at a high flow rate, e.g., a flow rate of approximately 30 standard cubic feet per minute per 1000 pounds of wax, until the desired acid number is achieved. The reaction is performed at atmospheric pressure using a conventional heated reaction vessel having an inner surface which will not react with the molten wax, e.g., a glass-lined or stainless steel reactor. To help initiate the reaction, a small amount of previously oxidized wax, e.g., the "heel" of a prior oxidization, can be added to the molten wax before sparging is begun. The starting synthetic wax, of course, should not include an antioxidant, i.e., it should be noninhibited. The oxidation follows procedures similar to those described in Upadhyaya, U.S. Pat. No. 4,624,993, the relevant portions of which are incorporated herein by reference. Typically, the oxidation can be completed in less than about 5 hours.

A variety of polyethylenes having Brookfield viscosities above about 5000 centipoise at 284° F., needle penetration values at 77° F. of less than 5 mm/10, and softening points in the range of 200° F. to 250° F., can be used in preparing the compositions of the invention. These materials, in both oxidized and non-oxidized form, are available from USI Chemicals Co. (New York, N.Y.), and Eastman Chemical Products, Inc., (Kingsport, Tenn.).

The choice between oxidized and non-oxidized components depends upon the particular application in which the final composition is to be used. For example, in the case of lubricants for use during the extrusion of plastics, it is desirable to have both polar groups for purposes of internal lubrication and non-polar groups for purposes of external lubrication. Accordingly, in this case, an oxidized (polar) synthetic wax in combination with a non-oxidized (non-polar) polyethylene is preferred. On the other hand, in the case of coatings for paperboard stock, a completely non-polar material can be used comprising a non-oxidized synthetic wax and a non-oxidized polyethylene. Persons skilled in the art will be able to make similar choices regarding the types of synthetic waxes and polyethylenes to use for particular applications in view of the disclosure herein.

In addition to the synthetic wax and polyethylene components, the compositions of the present invention can include one or more modifiers for adjusting specific physical properties of the final product. For example, ethylene copolymers can be used to adjust the viscosity, melting point, and acid number of the final product. In addition to modifiers, the compositions of the invention can include other ingredients including antioxidants, such as BHT, and coloring agents.

As discussed above, at a minimum, the compositions of the present invention include 50 weight percent of synthetic wax. Higher amounts of this component are in general preferred, with amounts in the range of 60-70 weight percent being most preferred. Typically, modifiers will represent less than about 15 weight percent of the final composition, and other ingredients, less than about 2 weight percent. As illustrated by the various examples presented below, the desired properties of the final product are achieved by adjusting the relative amounts of the various components within the foregoing ranges.

The compositions of the present invention can most simply be formulated by melting the various components and mixing them together. In general, it is preferred to melt the synthetic wax first and then add the rest of the ingredients to this component, with the polyethylene component being added first, followed by the modifiers, if any, and the other ingredients, if any. As illustrated by the examples presented below, other orders of addition can also be used. To avoid phase separations when the mixture is cooled, as well as to avoid loss of acid number and general description of the product, it is of particular importance that the polyethylene component be melted and thoroughly heated before it is combined with the synthetic wax component. In general, each of the components should be heated to a temperature approximately 30° C. above its melting point before mixing is performed. Alternatively, the wax components can be added as powders to the molten polyethylene component. The mixing itself should take place for a period of at least one hour to ensure complete integration of the various components of the product.

If oxidation of the synthetic wax is being performed using the procedures described above, the polyethylene component can be melted and added to the mixture after part of the oxidation has been performed, and then oxidation can be continued until the desired acid number for the final product has been achieved (see Example 1 below). Although not wishing to be bound by any particular theory of operation, it is believed that essentially only the synthetic wax is oxidized during this continuation of the oxidation, with little or no oxidation of the polyethylene component and little or no cross-linking between the synthetic wax and the polyethylene. This belief is based on the fact that essentially identical properties for the final product are achieved by mixing oxidized synthetic wax and polyethylene, as are achieved by oxidizing the synthetic wax in the presence of the polyethylene.

Without intending to limit it in any manner, the present invention will be more fully described by the following examples.

EXAMPLE 1

This example illustrates the use of an oxidized Fischer-Tropsch wax and a non-oxidized polyethylene to prepare a composition having comparable properties to those of Allied Chemical Corporation's low viscosity polyethylene sold under the designation A-C®629. This example also illustrates the use of the preferred oxidation procedure referred to above.

The materials used were as follows: Fischer-Tropsch wax—PARAFLINT® H-2 sold by Moore and Munger Marketing and Refining, Inc., (Fairfield, Conn.); non-oxidized polyethylene—PETROTHENE® NA 601-00 sold by U.S.I. Chemicals Co. (New York, N.Y.) and having a Brookfield viscosity of 8500 centipoise at 150° C., a needle penetration value (ASTM D 1321) at 77° F. of 3.6 mm/10, and a softening point (ASTM E 28) of 216° F.; antioxidant—BHT sold by Koppers Company, Inc. (Pittsburgh, Pa.). PARAFLINT® H-2 has a molecular weight range of 300 to 1500 and is composed almost entirely of long-chain, unbranched, saturated hydrocarbons, with a small percentage of branched, saturated hydrocarbons. It has a needle penetration value (ASTM D 1321) at 77° F. of less than 2 mm/10 (1 mm/10 typical), a congealing point (ASTM D938) of 205° F., and a Brookfield viscosity at 284° F. of less than 10. In addition to the PARAFLINT® H-2, a small amount of oxidized Fischer-Tropsch wax, specifically PARAFLINT® A-1 sold by Moore and Munger Marketing and Refining, Inc., was used as an initiator for the oxidation reaction. This wax has a needle penetration value (ASTM D 1321) at 77° F. of 7 mm/10, a congealing point (ASTM D938) of 188° F., and a Brookfield viscosity at 284° F. of less than 10.

The reaction was conducted in a conventional steam-jacketed reaction vessel equipped with a water-cooled condenser, a stirrer, and a sparger which produced air bubbles having a diameter of approximately 10 millimeters.

The composition was prepared as follows: 5,228 pounds of melted PARAFLINT® H-2, representing 97% of the wax component, were introduced into the reaction vessel. The melted wax was sparged with nitrogen and stirred. 162 pounds of PARAFLINT® A-1, representing 3% of the wax component, were then added, and the temperature of the mixture was brought up to 170°-175° C. Air was then sparged through the mixture at a rate of approximately 0.028 SCFM/pound of wax and samples were taken every 30 minutes until an acid number of 20-23 was reached. 2,695 pounds of molten PETROTHENE® NA 601-00, representing 50% of the wax charge, were then added to the reaction vessel and sparging at 170°-175° C. was continued for another hour until an acid number in the range of 15-17 was achieved. Sparging was then stopped, the mixture was cooled to 120° C., and 4 pounds of BHT (500 parts per million) were added with stirring. The final product was transferred directly from the reactor to a flaker. Alternatively, the product can be transferred to a priller or spray tower.

The properties of the finished product were as follows: melting point (ASTM D 127)—200°-210° F. (206° F. typical); Brookfield viscosity—200-225 centipoise at 284° F. (214 centipoise typical); needle penetration (ASTM D 1321)—5-8 mm/10 at 77° F. (5.5 mm/10 typical); acid number (ASTM D-1386)—15-17 mg KOH/gm (16 mg KOH/gm typical); color (ASTM D 1500)—1 (typical).

EXAMPLE 2

This example illustrates the preparation of a composition having the same properties as those of the composition of Example 1 by simply mixing together an oxidized Fischer-Tropsch wax and a non-oxidized polyethylene.

The materials used were: PARAFLINT® A-1—64 weight %; PARAFLINT® H-2—4 weight %; PETROTHENE® NA 601—32 weight %; and BHT—500 parts per million. PARAFLINT® A-1 is an oxidized Fischer-Tropsch wax having an acid value of 25-30 mg KOH/gm. Its viscosity, congealing point and needle penetration value are given above.

The materials were combined in a heated reaction vessel equipped with a stirrer as follows: PETROTHENE® NA 601 was heated to 170° C. and maintained between 170° C. and 175° C. until it was fully melted, i.e., until it was completely clear. PARAFLINT® A-1, in powder form, and BHT were then slowly added to the molten polyethylene with good agitation. The temperature of the mixture was maintained between 140°-150° C. as the addition was made. Finally, PARAFLINT® H-2, also in powder form, was added, again with good agitation and with the temperature maintained in the same range. Thereafter, the mixture was heated to 155°-160° C. and maintained at that temperature with agitation, for 1 hour. Finally, the mixture was cooled to 120° C. and transferred directly from the reactor to a flaker.

The final product was found to have essentially identical physical properties to those produced by the process of Example 1 (see Example 5 below).

EXAMPLE 3

This example illustrates the use of non-oxidized synthetic wax in combination with non-oxidized polyethylene to produce a final product suitable for use in coating corrugated paper board.

The materials used were: PARAFLINT® H-1—55.2 weight %; PETROTHENE® NA 601—44.8 weight %; and BHT—500 parts per million. PARAFLINT® H-1 is a non-oxidized, inhibited Fischer-Tropsch wax having a Brookfield viscosity at 284° F. of 7 centipoise, a needle penetration value (ASTM D1321) at 77° F. of less than 2 mm/10, and a congealing point (ASTM D938) of 205° F.

The materials were combined in a heated reaction vessel equipped with a stirrer as follows: The PARAFLINT® H-1 and PETROTHENE® NA 601 were added to the reaction vessel and heated to 300°-320° F. They were then mixed at 310° F. until homogeneous. Thereafter, the temperature was reduced to 250° F. and the BHT was added. The final mixture was transferred directly from the reactor to a flaker.

The properties of the finished product were as follows: melting point (ASTM D127)—220°-230° F. (226° F. typical); Brookfield viscosity—370–430 centipoise at 284° F. (400 centipoise typical); needle pentration (ASTM D 1321)—1.2 mm/10 at 77° F. (1.5 mm/10 typical); color(ASTM D-1500)—less than 0.5. When used in coating corrugated paperboard, the product has been found to have functional properties which match those of Allied Chemical Corporation's A-C®6 low viscosity polyethylene.

EXAMPLE 4

This example illustrates the effects of acid number on the physical properties of the final property. Seven products were prepared in accordance with the procedures of Example 2. The components used and the physical properties of the final product are shown in Table 1, where "oxidized H-2" refers to PARA-FLINT® H-2 which has been oxidized to the indicated total acid number ("TAN") by the sparging method of Example 1.

As shown in this table, as the acid number increases, the viscosity and needle penetration value increase and the melting point decreases.

Taken together, Examples 1–4 illustrate how the properties of the final product can be readily customized for specific applications by varying the amounts and types of components employed in the formulation of the product.

EXAMPLE 5

This example compares the physical properties of compositions prepared in accordance with the present invention with the physical properties of Allied Chemical Corporation's A-C®629 low viscosity polyethylene.

The products of Examples 1 and 2 were used for the comparison. In addition, the product of Example 2 was prepared with EPOLENE® C-10 substituted on a gram-for-gram basis for PETROTHENE® NA 601. EPOLENE® C-10 is a non-oxidized polyethylene sold by Eastman Chemical Products, Inc., (Kingsport, Tenn.). It has a Brookfield viscosity of 7800 centipoise at 302° F., a needle penetration value (ASTM D1321) at 77° F. of 3 mm/10, and a softening point (ASTM E-28) of 220° F.

The results of the comparison are shown in Table 2. As shown therein, the three compositions prepared in accordance with the invention have essentially identical properties, and those properties match the properties of A-C®629.

EXAMPLE 6

This example compares the functional properties of compositions prepared in accordance with the present invention with the functional properties of Allied Chemical Corporation's A-C®629 low viscosity polyethylene. In particular, the ability to serve as a lubricant for PVC extrusions is compared.

The product of Example 2 and A-C®629 were used as lubricants in a standard PVC formulation suitable for making PVC pipe. The specific formulation employed is set forth in Table 3.

The lubricating ability of the Example 2 product and A-C®629 were compared using a Brabender torque rheometer. The results are shown in Table 3. As shown therein, the Example 2 product provided comparable lubrication performance to A-C®629.

Experiments were also performed using the Example 2 product with EPOLENE® C-10 substituted for PETROTHENE® NA 601 on a gram-for-gram basis. This product also provided comparable lubrication performance to A-C®629. Further experiments were performed with the C-10 and NA 601 products in a PVC formulation differing from that of shown in Table 3. Again, the products of the present invention exhibited comparable functional properties to those of A-C®629.

In addition to the foregoing, PVC pipe was prepared using the product of Example 2 as a lubricant and was subjected to long-term hydrostatic pressure testing. The pipe did not develop leaks over a period of more than 8,000 hours.

EXAMPLE 7

This example compares the functional properties of compositions prepared in accordance with the present invention with the functional properties of Allied Chemical Corporation's A-C®6 low viscosity polyethylene. In particular, the ability to serve as part of a filler for telephone cables is compared.

The filler comprised 87.5% of Amoco's H-1500 polybutene and 12.5% of either the product of Example 3 or Allied's A-C®6. As shown in Table 4, the two fillers were found to have equivalent physical properties. Moreover, in use, the fillers were found to have equivalent functional properties.

Fillers with additional components, such as, white mineral oil, amorphous polypropylene, and solid chlorinated paraffin resin, were also prepared using the product of Example 3 and Allied's A-C®6. Again, the product of Example 3 was found to be functionally equivalent to A-C®6.

TABLE 1

|  | Viscosity at 284° F. cps | Acid Number mg KOH/gm | Melting Point, °F. ASTM D 127 | Needle Pen. at 77° F. |
|---|---|---|---|---|
| Oxidized H-2 (TAN = 8.4) 66.7% PETROTHENE NA 601 33.3% | 200 | 5.8 | 218 | 2 |
| Oxidized H-2 (TAN = 15.2) 66.7% PETROTHENE NA 601 33.3% | 210 | 9.8 | 213 | 3 |
| Oxidized H-2 (TAN = 25.9) 66.7% PETROTHENE NA 601 33.3% | 235 | 15.3 | 206 | 5 |
| PARAFLINT A-1 20% PARAFLINT H-1 46.7% PETROTHENE NA 601 33.3% | 190 | 5.8 | 219 | 2 |
| PARAFLINT A-1 40% PARAFLINT H-1 26.7% PETROTHENE NA 601 33.3% | 210 | 11.6 | 215 | 3 |
| PARAFLINT A-1 60% | 225 | 17.4 | 205 | 4 |

TABLE 1-continued

| | Viscosity at 284° F. cps | Acid Number mg KOH/gm | Melting Point, °F. ASTM D 127 | Needle Pen. at 77° F. |
|---|---|---|---|---|
| PARAFLINT H-1 6.7% PETROTHENE NA 601 33.3% | | | | |
| PARAFLINT H-1 66.7% PETROTHENE NA 601 33.3% | 175 | 0 | 221 | 2 |

TABLE 2

| Components | Example 1 | Example 2 | AC-629 |
|---|---|---|---|
| PARAFLINT H-2, % | 64.7 | 4.0 | 4.0 |
| PARAFLINT A-1, % | 2.0 | 64.0 | 64.0 |
| NA 601, % | 33.3 | 32.0 | — |
| EPOLENE C-10, % | — | — | 32.0 |
| Properties | | | |
| Melting Point, °F. ASTM D-127 | 205 | 206 | 206 | 210 |
| Ring and Ball Softening Point, °F. ASTM E-28 | 208 | 208 | 209 | 220 |
| Brookfield Viscosity, cps | | | | |
| at 265° F. | 315 | 310 | 315 | 300 |
| at 284° F. | 216 | 215 | 210 | 210 |
| at 300° F. | 170 | 165 | 160 | 190 |
| Needle Penetration, mm/10 (ASTM D 1321) | | | | |
| at 77° F. | 6 | 5 | 4.5 | 5.5 |
| at 100° F. | 13 | 11 | 10.5 | 11.5 |
| Color, ASTM D-1500 | 0.5 | 1.5 | 1.5 | 0.5 |
| Acid No., mg KOH/gm | 16 | 16.4 | 16.3 | 16 |

TABLE 3

COMPARATIVE BRABENDER RESULTS
PVC Pipe Compositions - Torque/Rheometer Data

| | 1 | 2 | 3 | 4 | 5 | 6 | 7 | 8 |
|---|---|---|---|---|---|---|---|---|
| Screw Type | Single | Single | Single | Single | Twin | Twin | Twin | Twin |
| Pipe Pressure | Low | Low | High | High | Low | Low | High | High |
| Materials* | | | | | | | | |
| Geon 30 PVC | 1500 | 1500 | 1500 | 1500 | 1500 | 1500 | 1500 | 1500 |
| Thermolite 136 stabilizer | 22.5 | 22.5 | 18 | 18 | 18 | 18 | 4.5 | 4.5 |
| Acryloid K-120 resin | 22.5 | 22.5 | 22.5 | 22.5 | — | — | — | — |
| Calcium Carbonate | 450 | 450 | 45 | 45 | 450 | 450 | 37.5 | 37.5 |
| Titanium Dioxide | 30 | 30 | 30 | 30 | 30 | 30 | 30 | 30 |
| Calcium Stearate | 30 | 30 | 15 | 15 | 30 | 30 | 12 | 12 |
| Paraffin (165 F) | 33 | 33 | 10.5 | 10.5 | 30 | 30 | 15 | 15 |
| Allied A-C 629A | 2.25 | — | 2.25 | — | 2.25 | — | 2.25 | — |
| Example 2 | — | 2.25 | — | 2.25 | — | 2.25 | — | 2.25 |
| Brabender Results | | | | | | | | |
| Fusion Time, sec | 318 | 432 | 60 | 60 | 528 | 678 | 150 | 168 |
| Torque at Fusion, MG** | 1700 | 1600 | 3075 | 2975 | 1850 | 1775 | 2750 | 2650 |
| Stability Time, sec | +900 | +900 | 522 | 558 | +900 | +900 | 354 | 372 |

*Geon is a registered trademark of B F Goodrich
Thermolite is a registered trademark of M and T Chemicals Inc.
Acryloid is a registered trademark of Rohm and Haas Company
A-C is a registered trademark of Allied Chemical
**Meter-Gram, a unit of torque measurement

TABLE 4

| | Example 3 | AC-6 | 12.5% Example 3 87.5% Amoco H-1500 | 12.5% AC-6 87.5% Amoco H-1500 |
|---|---|---|---|---|
| Viscosity at 284° F., cps | 400 | 390 | 405 | 415 |
| Softening Point Ring and Ball, °F. | 226 | 223 | 206 | 207 |

What is claimed is:

1. A composition comprising:
   (a) one or more synthetic waxes each of which has been produced synthetically by polymerizing smaller building blocks and each of which has a Brookfield viscosity at 284° F. of less than 50 centipoise, a needle penetration value at 77° F. of less than 20 mm/10, and a congealing point in the range of from about 160° F. to about 240° F., said one or more synthetic waxes comprising between about 50 and about 80 percent by weight of the total composition; and
   (b) a polyethylene material having a Brookfield viscosity at 284° F. greater than about 5000 centipoise, a needle penetration value at 77° F. of less than 5 mm/10, and a softening point in the range of from about 200° F. to about 250° F., said polyethylene material comprising between about 10 and about 50 percent by weight of the total composition;
   the final composition having a Brookfield viscosity at 284° F. of less than about 1000 centipoise, a needle penetration value at 77° F. of less than 10 mm/10, and a melting point in the range of from about 190° F. to about 240° F.

2. The composition of claim 1 wherein the one or more synthetic waxes comprise between about 60 and about 70 percent by weight of the total composition.

3. The composition of claim 1 wherein the one or more synthetic waxes include an oxidized synthetic wax having an acid number between about 2 and about 50.

4. The composition of claim 3 wherein the acid number of the oxidized synthetic wax is between about 10 and about 30.

5. The composition of claim 1 wherein the one or more synthetic waxes includes a Fischer-Tropsch wax.

6. The composition of claim 1 wherein the polyethylene material has been oxidized.

7. A composition comprising 60-70 percent by weight of an oxidized Fischer-Tropsch synthetic wax, said wax having a Brookfield viscosity at 284° F. of less than 50 centipoise, a needle penetration value at 77° F. of less than 20 mm/10, a congealing point in the range of 160° F. to 240° F., and an acid number between about 2 and about 50, and 30-40 percent by weight of a non-oxidized polyethylene having a Brookfield viscosity at 284° F. greater than about 5000 centipoise, said composition having a Brookfield viscosity at 284° F. of 175-250 centipoise and an acid number of 10-20 mg KOH/gm.

8. A composition comprising 50-60 percent by weight of a non-oxidized Fischer-Tropsch synthetic wax, said wax having a Brookfield viscosity at 284° F. of less than 50 centipoise, a needle penetration value at 77° F. of less than 20 mm/10, and a congealing point in the range of 160° F. to 240° F., and 40-50 percent by weight of a non-oxidized polyethylene having a Brookfield viscosity at 284° F. greater than about 5000 centipoise, said composition having a Brookfield viscosity at 284° F. of 350-450 centipoise.

* * * * *